US006585951B1

(12) United States Patent
Hong et al.

(10) Patent No.: US 6,585,951 B1
(45) Date of Patent: Jul. 1, 2003

(54) METHODS FOR MANUFACTURING DIELECTRIC POWDERS

(75) Inventors: Yang-Ki Hong, Moscow, ID (US); Mun-Hyoun Park, Moscow, ID (US)

(73) Assignee: Idaho Research Foundation, Inc., Moscow, ID (US)

( * ) Notice: Subject to any disclaimer, the term of this patent is extended or adjusted under 35 U.S.C. 154(b) by 0 days.

(21) Appl. No.: 09/702,281

(22) Filed: Oct. 30, 2000

(51) Int. Cl.$^7$ .............................................. C01G 23/00
(52) U.S. Cl. ........................ 423/598; 501/10; 501/136; 501/137
(58) Field of Search ................. 423/598, DIG. 12, 423/594, 593, 592; 501/10, 136, 137

(56) References Cited

U.S. PATENT DOCUMENTS

| | | | | | |
|---|---|---|---|---|---|
| 3,630,667 | A | * | 12/1971 | Shirk | 423/594 |
| 4,265,872 | A | * | 5/1981 | Fujiki | 423/598 |
| 4,534,956 | A | * | 8/1985 | Arendt et al. | 423/598 |
| 4,677,083 | A | | 6/1987 | Uedaira et al. | |
| 5,531,974 | A | * | 7/1996 | Bak et al. | 423/263 |
| 5,910,462 | A | * | 6/1999 | Gani et al. | 501/80 |

FOREIGN PATENT DOCUMENTS

| | | | |
|---|---|---|---|
| JP | 64-14114 | * | 1/1989 |
| JP | 1-131027 | * | 5/1989 |
| JP | 4308729 | * | 9/1994 |

OTHER PUBLICATIONS

Gallagher, P.K. et al., "Preparation of Semiconducting Titanates by Chemical Methods," *J. Am. Ceram. Soc.* 46:359–365 (Aug. 1963).

Schrey, F., "Effect of pH on the Chemical Preparation of Barium–Strontium Titanate," *J. Am. Cer. Soc.* 48:401–405 (Aug. 1965).

Ali, N.J. and Milne, S.J., "Synthesis and Processing Characteristics of $Ba_{0.65}Sr_{0.35}TiO_3$ Powders from Catecholate Precursors," *J. Am. Ceram. Soc.* 76:2321–2326 (1993), No Month.

Noh T. et al., "Chemical Preparation of Barium–Strontium Titanate," *Bull. Korean Chem. Soc.* 16:1180–1184 (1995), No Month.

Hayashi T. et al., "Preparation of $(Ba_xSr_{1-x}TiO_3$ Particles by Vapor–Phase Hydrolysis of Precursors Formed from Alkoxide–Hydroxide," *Jpn. J. Appl. Phys.* 37:5232–5236 (Sep. 1998).

* cited by examiner

*Primary Examiner*—Steven Bos
(74) *Attorney, Agent, or Firm*—Klarquist Sparkman, LLP

(57) ABSTRACT

Methods for manufacturing a powder of a dielectric compound include mixing particle components that are combinable to form the dielectric compound with matrix components. The mixture is melted, and the molten mixture is quenched to produce a solid material. The dielectric power is extracted from the solid material. A molar ratio of particle components to matrix components can be selected so that the solid material produced by quenching is amorphous. Particle components can be selected to produce $Ba_{1-x}Sr_xTiO_3$ powder, wherein $0 \leq x \leq 1$. Matrix components consist essentially of $Na_2O \cdot 2B_2O_3$ and $Na_2O \cdot SiO_2 \cdot 9H_2O$ or can be selected from a group consisting of zinc oxide, zinc carbonate, and zinc hydroxide.

26 Claims, 10 Drawing Sheets

METHODS FOR MANUFACTURING DIELECTRIC POWDERS

FIELD OF THE INVENTION

The invention pertains to methods for manufacturing dielectric materials.

BACKGROUND

Barium strontium titanate (BST) is used in electronic devices, particularly in electronic devices such as capacitors, because of its high dielectric constant (between approximately 200 and 6,000). Other applications of BST include capacitor-varistors, positive temperature coefficient (PTC) resistors, thick film multilayer ceramic capacitors (MLC), embedded capacitance laminates, and bulk ceramic transducers. Thick films of BST have also been used in gigabit dynamic random access memory devices (DRAMs), in bypass capacitors, in filters, and in GaAs microwave monolithic integrated circuit (MMICs).

Practical applications of BST require inexpensive manufacturing processes that are applicable to small geometry devices. One method of maintaining a selected value of capacitance while shrinking the size of a capacitor is the use of small BST particles. Unfortunately, such small BST particles cannot be manufactured by conventional ceramic processes that produce BST particles that tend to stick together or agglomerate, increasing the effective particle size.

Conventional sputtering processes used to form BST films produce reproducible films, but the quality of these films depends on the quality of the sputtering target. In addition, the deposition rate of such BST films can be low, restricting the use of BST films to devices that are produced in low volumes. Improved BST sputtering targets are needed to achieve the higher deposition rates necessary for high volume production.

A significant factor in producing a satisfactory sputtering target is the quality of the BST powder used to make the target. The performance of a sputtering target depends on BST particle size, size distribution, chemical homogeneity, and sintering temperature. The sintering temperature of a BST target can be lowered by using small particles. Nanometer-sized BST particles are infrequently used because such particles are much more expensive than larger, agglomerated particles that have a wide range of particle sizes. Existing processes for nanometer-sized BST particles involve high temperature processing, expensive organometallic precursors, hazardous and lengthy process steps, and hazardous reagents, and produce irregularly shaped or agglomerated particles.

One prior art method of manufacturing BST particles is referred to as an oxalic precipitation method. In this method, $Ba_{0.6}Sr_{0.4}TiO(OH)_2C_2O_4 \cdot 4H_2O$ precipitate is prepared by co-precipitation of cations as a mixed oxalate in an oxalic acid solution. The precipitate is calcined at 900° C.–1000° C. to convert the precipitate into BST. See, for example, P. K. Gallagher et al., "Preparation of Semiconducting Titanates by Chemical Method," J. Am. Ceram. Soc., vol. 46, pp 359–365 (1963) and F. Schrey, "Effect of pH on the Chemical Preparation of Barium-Strontium Titanate," J. Am. Cer. Soc., vol. 48, pp 401–405 (1965). The oxalic precipitation methods described in these references are complex, and the organic compounds used are expensive. In addition, the BST particles produced by these methods are irregularly shaped, strongly agglomerated, and are large, having dimensions of between 500 nm and 800 nm.

U.S. Pat. No. 4,677,083 discloses another method of preparing BST powders. In this method, a $TiCl_4$ solution is mixed with barium nitrate and strontium nitrate at a pH of 14. This mixture is held at a temperature of 100° C. for 4 hours, followed by drying at 100° C. for 24 hours, forming a product that includes KCl and $KNO_3$ as by-products. These by-products are removed and the remaining product is heat-treated at 800° C. for 2 hours. This process requires removal of the KCl and $KNO_3$ by-products prior to heat treatment. In addition, this process involves dilution of a $TiCl_4$ solution at a high pH, increasing the cost of this method. The BST particles produced by this process are irregularly shaped and the particle size varies over a wide range.

Another process for the precipitation of BST particles includes synthesis of $BaTi(C_6H_4O_2)_3$ and $SrTi(C_6H_4O_2)_3$ by reacting titanium tetrachloride and $C_6H_4(OH)_2$ in a toluene solvent with boiling water suspensions of $BaCO_3$ and $SrCO_3$, respectively. This produces aqueous solutions of $BaTi(C_6H_4O_2)_3$ and $SrTi(C_6H_4O_2)_3$ that are freeze dried, forming a mixture of solid complexes. The mixture is subjected to pyrolysis and calcination at 700° C. for 2 hours. This process produces strongly agglomerated, irregularly shaped BST particles having dimensions of about 800 nm. This method and the BST particles produced by this method are discussed in N. J. Ali and S. J. Milne, "Synthesis and Processing Characteristics of $Ba_{0.65}Sr_{0.35}TiO_3$ Powders from Catecholate Precursors," J. Am. Ceram. Soc., vol. 76, pp. 2321–2326 (1993).

Another method of producing BST particles involves the synthesis of an oxalate precipitate, $Ba_{1-x}Sr_xTiO_3(C_2O_4)_2 \cdot 4H_2O$ (wherein $0.0 \leq x \leq 0.3$), by mixing $TiO(NO_3)_2$, $Ba(NO_3)_2$, $Sr(NO_3)_2$, and a titanyl oxalate solution to produce a precipitate that is calcinated for 2 hours at 900° C. This process is described in T. Noh et al., "Chemical Preparation of Barium-Strontium Titanate," Bull. Korean Chem. Soc., vol. 16, pp. 1180–1184 (1995). This method produces strongly agglomerated BST particles having dimensions of between about 13 nm and 40 nm.

In another method, BST particles are prepared by a vapor-phase hydrolysis of precursors obtained from alkoxide-hydroxide. This method involves preparation of $Ba(OH)_2 \cdot 8H_2O$ and $Sr(OH)_2 \cdot 8H_2O$ at 300° C. to obtain precursors $Ba(OH)_2 \cdot H_2O$ and $Sr(OH)_2$, respectively. These precursors are dissolved in methanol mixed with Ti-isopropoxide in a dry $N_2$ environment, and maintained for 15 hours at room temperature. The methanol is then evaporated, producing a powder precursor that is then slowly hydrolyzed at 100° C. in an $N_2$ environment. The hydrolyzed powder is then calcined at 900° C. for 2 hours, and ball milled in alcohol for 24 hours to obtain BST particles. The BST particles produced by this method are strongly agglomerated and are not separable by ultrasonication. This method is described more fully in T. Hayashi et al., "Preparation of $Ba_{1-x}Sr_xTiO_3$ Particles by Vapor-Phase Hydrolysis of Precursors Formed from Alkoxide-Hydroxide," Jpn. J. Appl. Phys., vol. 37, pp. 5232–5236 (1998).

In summary, solution-based BST powder synthesis methods involve difficult chemical precipitation steps, and produce BST particles that are large, irregularly shaped, or strongly agglomerated. In addition, these methods produce BST particles having varying chemical compositions and use expensive organic precursors and hazardous process steps. None of these methods produce acceptably sized and shaped BST particles and new methods and apparatus for the production of such particles are needed.

SUMMARY OF THE INVENTION

Methods form manufacturing nanometer-sized barium strontium titanate $Ba_{1-x}Sr_xTiO_3$ (BST) particles and particles of other materials, such as barium ferrites, metal oxides (e.g., iron oxide, tin oxide), and other semiconductors, insulators, ferrolectrics are provided. The methods include mixing BST particle components and matrix components that are melted to form a glassy matrix containing BST particles or precursors thereof. The BST particle components include oxides, hydroxides, and carbonates of barium, strontium, and titanium. Matrix components include materials comprising sodium, particularly sodium salts such as sodium borate ($Na_2O \cdot 2B_2O_3$), sodium carbonate ($Na_2CO_3$), and sodium silicate ($Na_2O \cdot SiO_2 \cdot 9H_2O$), selected according to a predetermined molar ratio. The mixture of particle components and matrix components is melted and the molten mixture is quenched in ice water or by another method to produce an amorphous material, typically in the form of flakes or other irregular solids. The amorphous material is annealed to form BST particles in the amorphous material. The BST particles are separated by exposing the flakes or other solids to an acidic solution (or other solution) that dissolves or otherwise removes a glassy matrix portion of the flakes.

In representative embodiments, methods of manufacturing a powder of a dielectric compound include selecting particle components combinable to form the dielectric compound and matrix components. The particle and matrix components are combined to form a mixture that is melted to produce a glassy matrix containing the dielectric compound or a precursor thereof. The molten mixture is quenched to produce solid material and the solid material is annealed to produce BST particles in a glassy matrix. The BST particles are removed from the glassy material by exposing the glassy matrix to a solution that removes the glassy matrix. In representative embodiments, the dielectric compound is $Ba_{1-x}Sr_xTiO_3$, wherein $0 \leq x \leq 1$. In further embodiments, the particle components are selected from a group consisting essentially of oxides, hydroxides, and carbonates of Ba, Sr, and Ti and the matrix components are selected from the group consisting of $Na_2O \cdot SiO_2 \cdot 9H_2O$, $Na_2O \cdot 2B_2O_3$, and $Na_2CO_3$.

In additional embodiments, the particle components are selected from the group consisting essentially of barium titanate ($BaTiO_3$), strontium titanate ($SrTiO_3$), barium carbonate ($BaCO_3$), strontium carbonate ($SrCO_3$), and titanium oxide ($TiO_2$) and the solution that separates the dielectric compound from the glassy matrix is an acidic solution.

In additional embodiments, a molar ratio of particle components to matrix components is selected so that the solid material produced by quenching includes an amorphous glassy matrix. In specific embodiments, a molar ratio of the particle components is selected based on a Ba fraction of the BST. In a representative embodiment, the molar ratio is between about 0.40 and 1.60.

In particular examples, the matrix components consist essentially of 1.34 part by mole $Na_2O \cdot 2B_2O_3$, 1.13 parts by mole $NaCO_3$ $Na_2CO_3$, and 1.0 parts by mole $Na_2O \cdot SiO_2 \cdot 9H_2O$.

In other examples, the solid material produced by quenching is annealed by exposing the solid material to a temperature in a range of about 450° C. to 700° C. for a period of about 2 hours.

In yet other examples, the matrix components include one or more of zinc oxide, zinc carbonate, or zinc hydroxide.

In some examples, the mixture of the particle components and matrix components is melted by exposing the mixture to a temperature in the range of about 1100° C. to 1,700° C.

Capacitors comprising a dielectric layer comprising BST particles having dimensions of less than about 80 nm, or preferably, less than about 40 nm are provided. Sputtering targets are provided that comprise BST particles having dimensions of less than about 80 nm, or preferably less than about 40 nm.

Methods of producing a dielectric powder comprise mixing powder components and matrix components to form a mixture. The mixture is melted and then cooled to form a glassy material. The glassy material is annealed to form the dielectric powder that is separated from the glassy material by exposing the glassy material to an acidic solution. In some embodiments, the annealing step includes annealing at a first temperature and a second temperature, wherein the first temperature is in a range of about 400° C. to 550° C. and the second temperature is in a range of about 550° C. to 700° C. In additional embodiments, the powder components consist essentially of compounds of Ba, Sr, and Ti and the matrix components consist essentially of $Na_2O \cdot 2B_2O_3$, $Na_2CO_3$, and $Na_2O \cdot SiO_2 \cdot 9H_2O$. In other representative embodiments, a molar ratio of the powder components to the matrix components is selected so that the glassy material includes an amorphous material formed by the matrix components.

A solid material for producing BST is provided that includes a glassy matrix and BST precursors. In representative embodiments, the glassy matrix is produced by melting one or more of the group consisting essentially of $Na_2O \cdot 2B_2O_3$, $Na_2CO_3$, and $Na_2O \cdot SiO_2 \cdot 9H_2O$ and the BST precursors consist essentially of oxides, hydroxides, and carbonates of barium, strontium, and titanium.

These and other feature and adventages of the invention are described with reference to the accompanying drawings.

DETAILED DESCRIPTION

Barium strontium titanate particles, capacitors, thermistors, sputtering targets, other devices using such particles, and manufacturing methods for such particles are described below.

Figure 1A:
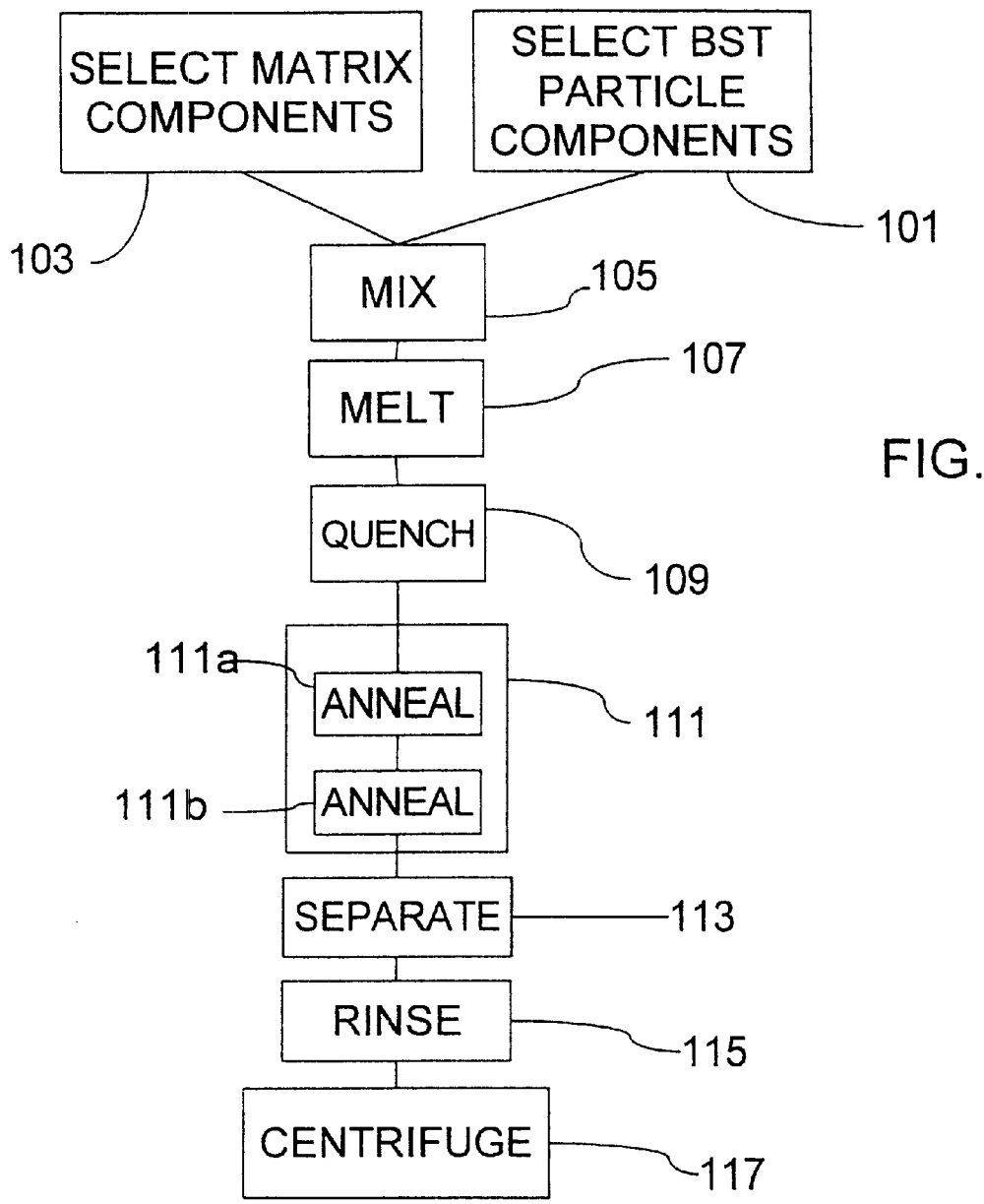
FIG. 1A is a block diagram of a method of producing $Ba_{1-x}Sr_xTiO_3$ (BST) particles.

With reference to FIG. 1, a method for manufacturing nanometer-sized barium strontium titanate $Ba_{1-x}Sr_xTiO_3$ ("BST") particles, wherein $0 \leq x \leq 1$, includes a step 101 of selecting particle components and a step 103 of selecting matrix components. The particle components include compounds containing Ba, Sr, or Ti that are thermally decomposable so that BST particles are formed after an annealing step. In a representative example, the particle components include one or more compounds or mixtures containing Ba, Sr, and Ti such as barium titanate ($BaTiO_3$), strontium titanate ($SrTiO_3$), barium carbonate ($BaCO_3$), strontium carbonate ($SrCO_3$), and titanium oxide ($TiO_2$). The matrix components include one or more compounds containing B and Na, such as oxides or salts of B and Na, including, but not limited to, sodium borate ($Na_2O \cdot 2B_2O_3$), sodium silicate ($Na_2O \cdot SiO_2 \cdot 9H_2O$), NaCl, $Na_2CO_3$, NaOH, $B_2O_3$, and the like. A representative selection of matrix components includes a combination of 1.34 parts by mole $Na_2O \cdot 2B_2O_3$, 1.13 parts by mole $Na_2CO_3$, and 1 part by mole $Na_2O \cdot SiO_2 \cdot 9H_2O$. The molar ratio of the particle components to the matrix components is typically between about 0.4 and 1.6.

The particle components and the matrix components are combined in a step 105 to produce a mixture that is melted in a step 107 and quenched in iced water or with a twin roller in a step 109 to produce a glassy matrix that includes BST particles and/or precursors for BST particles as well as Ti-rich and borate-rich glass phases, such as a partially crystallized sodium borate phase. The molar ratio of the particle components and the matrix components can be selected to provide a selected melting temperature. The quenching step 109 typically produces the glassy matrix in the form of flakes or other irregularly shaped solids. After the quenching step 109, the flakes are heat-treated in a step 111 that includes one or more annealing steps 111a, 111b. In a representative example, the annealing step 111a is performed at a temperature of between 450° C. and 550° C. with the flakes exposed to air or other gas or gas mixture, and the annealing step 111b is performed at a temperature of between 550° C. and 700° C. with the flakes exposed to air or other gas or gas mixture. The step 111 produces crystallized BST particles and partially crystallized sodium borate glass.

The BST particles are separated from the glassy matrix with a dilute acid such as $CH_3COOH$, HCl, $H_2SO_4$, $HNO_3$ or the like in a separation step 113. A concentrated or dilute acid can be used, and either a strong or weak acid is suitable. After separation from the glassy matrix, the BST particles are rinsed with purified water in a step 115, and nanometer-sized BST particles are obtained by centrifuging a slurry of the BST particles and water in a step 117.

Figure 1B:
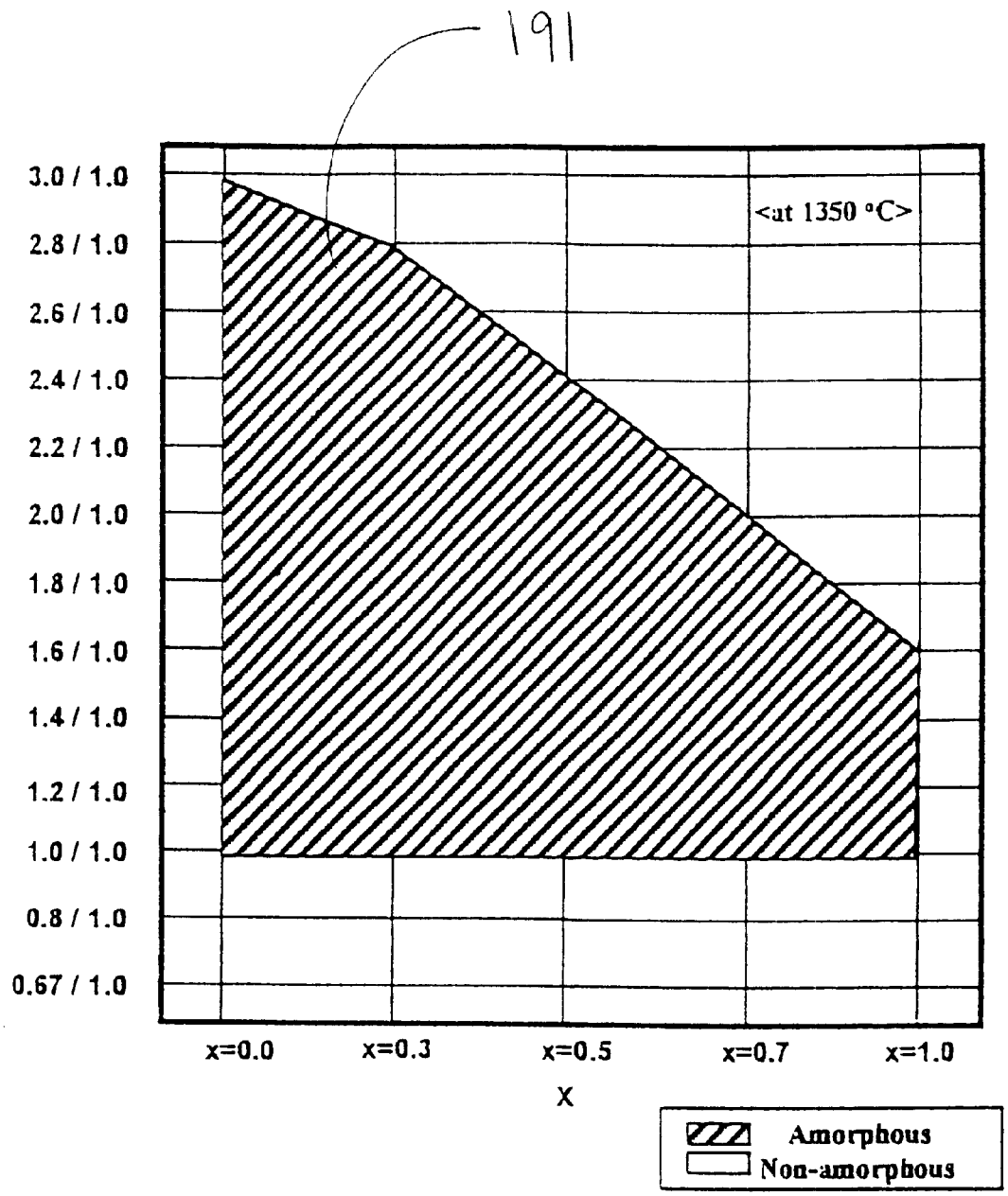
FIG. 1B is a graph that includes a hatched region corresponding to combinations of values of a molar ratio R of particle components to matrix components and values of a BST composition x that produce an amorphous matrix containing BST or BST precursors.
Figure 2A:
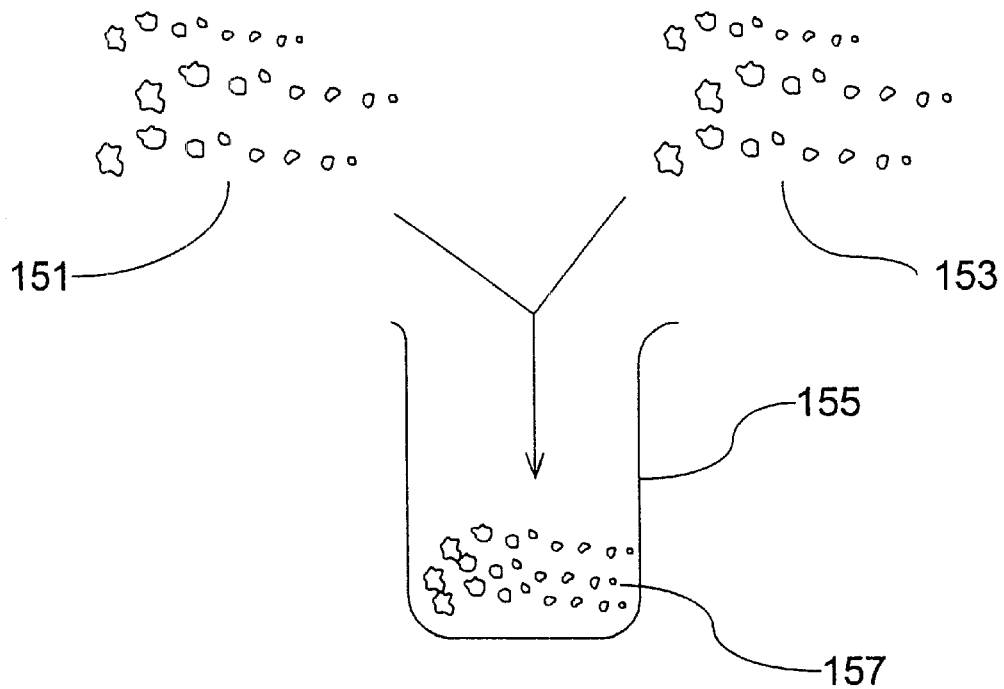
FIGS. 2A–2D are schematics illustrating one embodiment of an apparatus for performing the method of FIG. 1A.
Figure 2D:
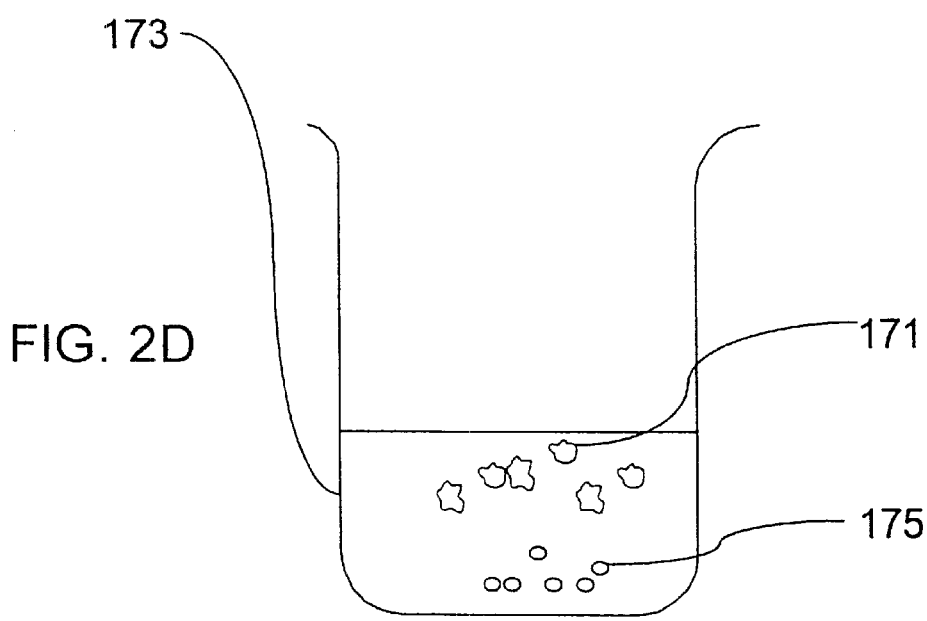
Figure 2B:
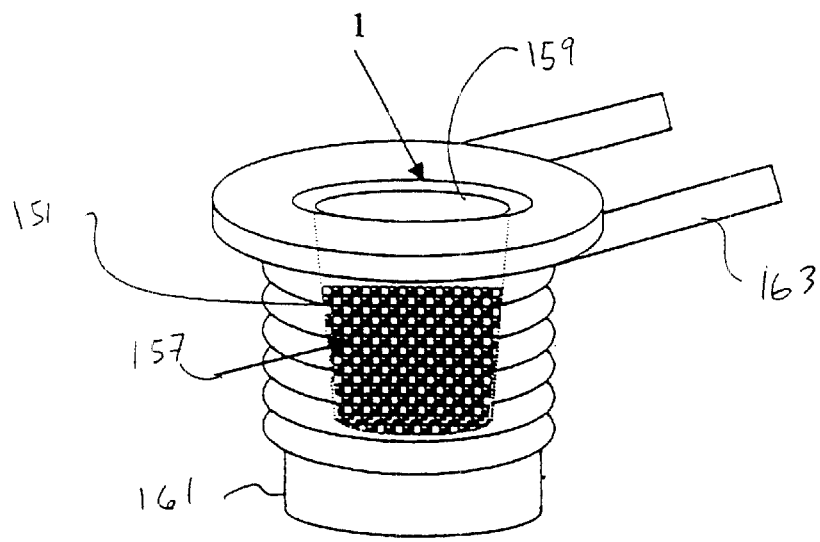
Figure 2C:
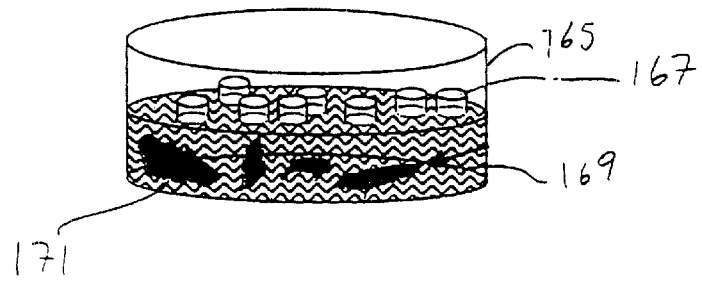

FIGS. 2A–2D are schematic views of a system for preparing BST particles using the method of FIG. 1. Referring to FIG. 2A, selected particle components 151 and matrix components 153 are mixed in a container 155 to form a mixture 157. As shown in FIG. 2B, the mixture 157 is placed in a platinum crucible 159 that is supported by a refractory material 161. The mixture 157 is heated with a high frequency radio frequency (RF) heater 163 or other heater to melt the mixture 157. With reference to FIG. 2C, the molten mixture 157 is rapidly quenched by pouring the mixture into a container 165 containing ice 167 and water 169. When poured into the container 165, the molten mixture 157 generally solidifies as flakes 171 or as other irregularly shaped solids. The flakes 171 are then exposed to one or more annealing steps. After one or more annealing steps at temperatures in the range of about 300° C.–1000° C., or more preferably in the range of about 400° C.–800° C., and conveniently in the range of 450° C.–700° C. The flakes 171 are exposed to an acid bath 173 that includes a weak acid such as acetic acid or hydrochloric acid as shown in FIG. 2B. The acid bath 173 dissolves a glassy matrix portion of the flakes 171, leaving a powder 175 that is a compound of the particle components 151. The powder 175 is rinsed and centrifuged to obtain nanometer-sized BST particles. The particles of the powder 175 generally are substantially spherical. As used herein, substantially spherical particles are particles having a mean aspect ratio generally less than about 2:1, desirably less than about 1.5:1, and most desirably less than about 1.25:1. The particles have a small range of particle sizes, are well separated, and typically have diameters of less than about 50 nm. In addition, the particles are substantially non-agglomerated, i.e., a particle having a selected minimum dimension can form a layer having a thickness of substantially the same dimension.

The particle components 151 are selected to include combinations of BST precursors to produce $Ba_{1-x}Sr_xTiO_3$ with a selected value of x, wherein $0 \leq x \leq 1$. For particle components that consist essentially of $BaCO_3$, $SrCO_3$, and $TiO_2$, a molar ratio of $BaCO_3:SrCO_3:TiO_2$ is typically selected as (1-x):x:1. Because replacement of $Ba^{+2}$ ions by $Sr^{+2}$ ions proceeds substantially stoichiometrically, an $SrCO_3$ portion of the particle components 151 can be provided in any amount. However, if the relative proportion of the $SrCO_3$ portion is too large, the flakes 171 (the as-quenched material) include partially crystallized BST. The proportion of the $SrCO_3$ portion at which partial crystallization occurs is a function of the selected BST composition (i.e., x) as well as the melting temperature of the particle components/matrix components mixture, and the composition of the matrix components.

Representative Manufacturing Conditions

When the matrix components include sodium borate, sodium silicate, and sodium carbonate, the glassy matrix generally crystallizes before crystallization of BST during annealing. To obtain an amorphous glassy matrix, a molar ratio R of particle components (such as $BaCO_3$, $SrC_3$, and $TiO_2$) to matrix components (such as $Na_2O \cdot 2B_2O_3$, $Na_2CO_3$, $Na_2O \cdot SiO_2 \cdot 9H_2O$) is selected based on a selected Sr content (i.e., x) of the BST particles. For x=0 (barium titanate), the molar ratio R is between about 1:1 and 3:1 to produce an amorphous as-quenched material. To produce an amorphous material containing Ba-Sr-Ti-O precursors for producing BST particles for x=0.5 and x=1.0, the molar ratio R is selected to be in the ranges 1:1 to 2:4 and 1:1 to 6:1, respectively.

With reference to FIG. 1B, the molar ratio R can be selected to produce an amorphous glassy matrix prior to annealing. A hatched area 191 designates suitable ranges for the molar ratio R as a function of Sr composition (x). BST particles produced using the molar ratios specified by the hatched area 191 are substantially spherical, have dimensions of less than about 70 nm, and are well separated The hatched area 191 corresponds to matrix components of 1.34 parts by mole $Na_2O \cdot 2B_2O_3$, 1.13 parts by mole $Na_2CO_3$, and 1 part by mole $Na_2O \cdot SiO_2 \cdot 9H_2O$, and a melting temperature of 1350° C. For other combinations of matrix components, different matrix components, and other melting and annealing temperatures, suitable ranges for the molar ratio R can be determined and displayed as an area on a graph of the molar ratio R as a function of BST composition x.

The invention is further illustrated below with reference to several representative examples.

Example 1

Figure 3A:
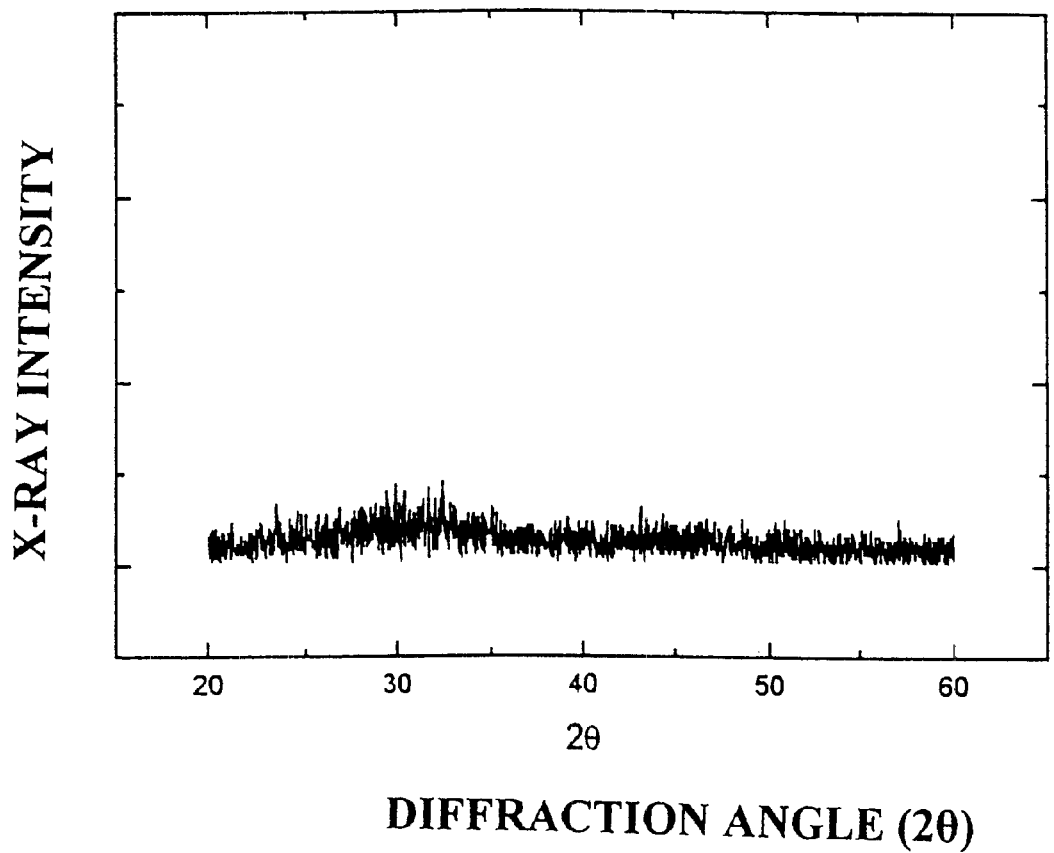
FIG. 3A is a graph of X-ray intensity as a function of diffraction angle for the solid material produced in the manufacture of $Ba_{0.5}Sr_{0.5}Ti_{0.3}$ particles according to the method of FIG. 1.

Particle components consisting essentially of 4.41 g $BaCO_3$, 3.30 g $SrCO_3$, 3.57 g $TiO_2$ (x=0.5) and matrix components consisting essentially of 5.66 g $Na_2O \cdot 2B_2O_3$, 3.51 g $Na_2CO_3$, and 7.06 g $Na_2O \cdot SiO_2 9H_2O$ were mixed, producing a mixture having the molar ratio R=0.79:1. The mixture was melted by heating to 1350° C. and then was maintained at 1350° C. for about 5 min. The molten mixture was poured into ice water, producing flakes that included Ti-rich and B-rich glass phases. With reference to FIG. 3A, a graph of X-ray intensity as a function of diffraction angle produced by an X-ray diffraction analysis of the flakes exhibits no peaks associated with a crystalline material and thus demonstrates that the flakes were amorphous (i.e., non-crystalline).

Figure 3B:
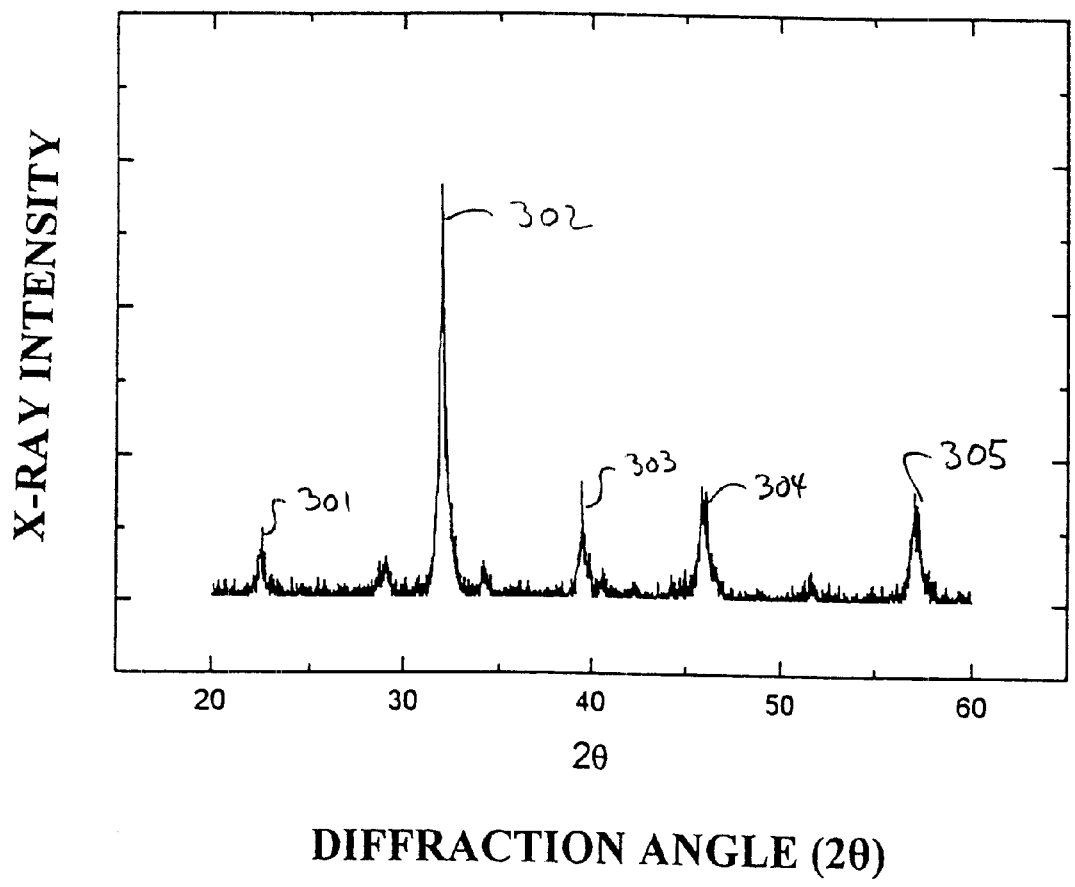
FIG. 3B is a graph of X-ray intensity as a function of diffraction angle for the solid material of FIG. 3A after annealing.

The flakes were annealed in an electric furnace for 7 h at a temperature of 480° C. and then annealed for 6 h at a temperature of 650° C. Both annealing steps were performed with the flakes exposed to air. With reference to FIG. 3B, a graph of X-ray intensity as a function of diffraction angle produced by an X-ray diffraction analysis of the annealed flakes exhibits peaks 301–305 that demonstrate that the annealed flakes included crystallized BST (x=0.5), partially crystallized sodium borate, and a sodium borate glass phase.

Figure 3C:
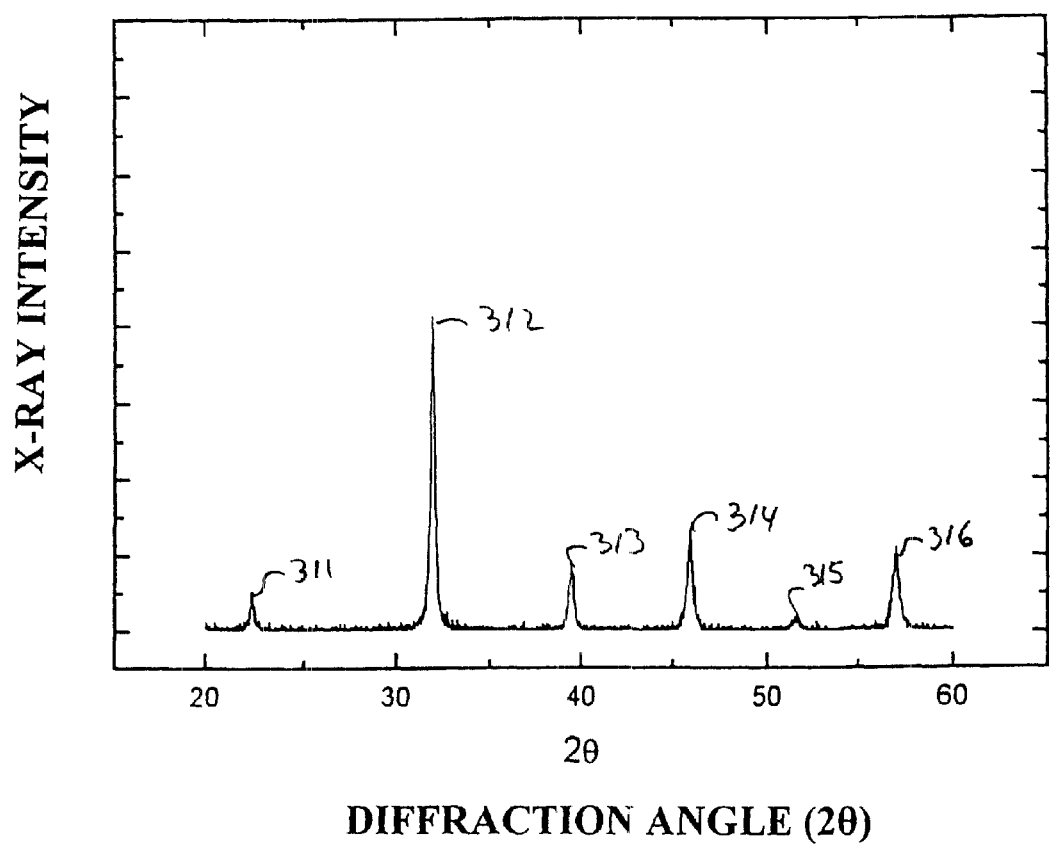
FIG. 3C is a graph of X-ray intensity as a function of diffraction angle for $Ba_{0.5}Sr_{0.5}Ti_{0.3}$ particles extracted from the annealed material.
Figure 3D:
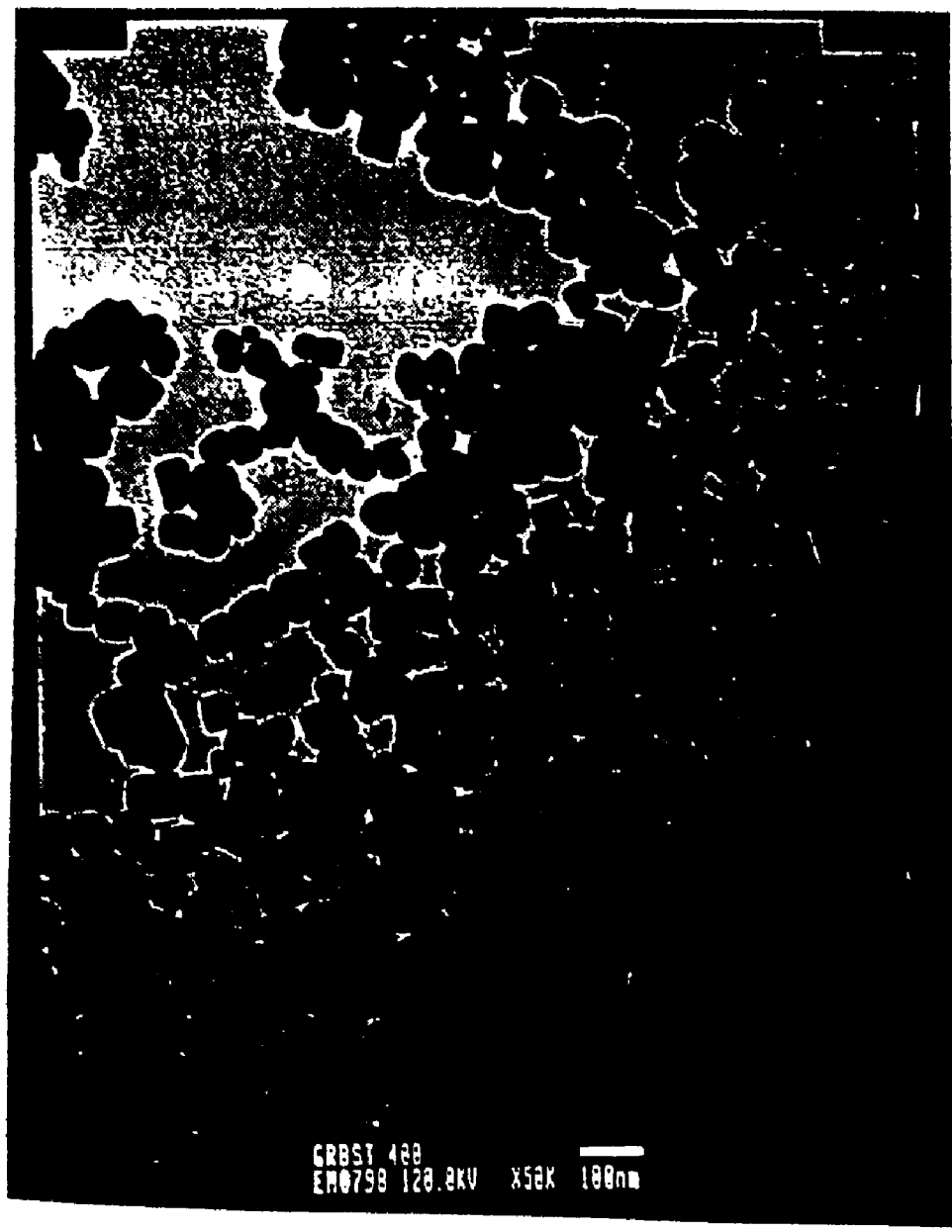
FIG. 3D is a transmission electron micrograph of nanometer-sized barium strontium titanate particles (x=0.3) manufactured by the method illustrated in FIG. 1.
Figure 3E:
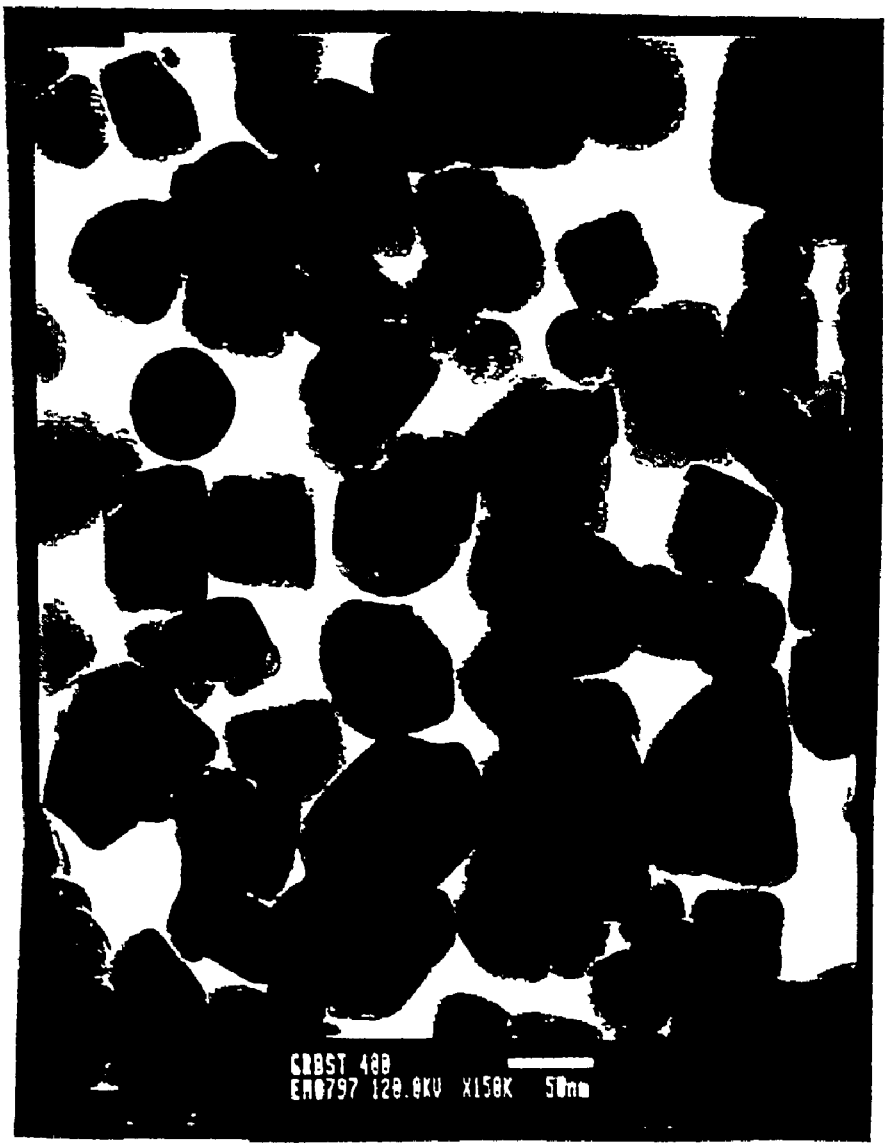
FIG. 3E is a transmission electron micrograph of barium strontium titanate (x=0.5) particles manufactured by the method illustrated in FIG. 1.

The annealed flakes were exposed to a dilute HCl solution (typically between about 0.01M and 0.1M) and rinsed with water (purified by reverse osmosis), producing a BST particle/water slurry. After centrifuging the slurry, nanometer-sized BST particles were obtained. With reference to FIG. 3C, a graph of X-ray intensity as a function of diffraction angle produced in an X-ray diffraction analysis of the BST particles exhibits peaks 311–316 that confirm the composition of the BST particles. Referring to FIGS. 3D–3E, electron micrographs of the as-centrifuged BST particles show that the BST particles were well separated, had a particle size of about 50 nm and a narrow particle size distribution. In addition, the BST particles were substantially spherical.

Example 2

Particle components consisting essentially of 9.80 g $BaCO_3$ and 3.97 g $TiO_2$ (x=0.0), and matrix components consisting essentially of 5.66 g $Na_2O \cdot 2B_2O_3$, 3.51 g $Na_2CO_3$, and 7.06 g $Na_2O \cdot SiO_2 9H_2O$ were combined, producing a mixture having the molar ratio R=0.88:1. The mixture was melted and quenched as in Example 1, producing flakes of an amorphous solid. X-ray analysis of the flakes shows that the flakes included Ti-rich and B-rich glass phases. A graph of X-ray diffraction intensity versus diffraction angle is similar to that of FIG. 3A, demonstrating the flakes were amorphous.

The flakes were annealed as in Example 1, producing an annealed material that included crystallized BST (x=0.0), partially crystallized sodium borate, and a sodium borate glass phase. After exposure to dilute HCl, a water rinse, and centrifugation, nanometer-sized BST particles were obtained. Electron micrographs of these BST particles are similar to those of FIGS. 3D–3E. The BST particles for x=0.0 were well separated, with a BST particle size of about 50 nm within a narrow range of particle sizes.

Example 3

Particle components consisting essentially of 6.18 g $BaCO_3$, 1.98 g $SrCO_3$, and 3.57 g $TiO_2$ (x=0.3) and matrix components consisting essentially of 5.66 g of $Na_2O \cdot 2B_2O_3$, 3.51 g $Na_2CO_3$, and 7.06 g $Na_2O \cdot SiO_2 9H_2O$ were combined, producing a mixture having the molar ratio R=0.79:1. The mixture was processed as in Examples 1 and 2 to produce BST particles, similar to those of Example 2.

Example 4

Particle components consisting essentially of 2.65 g $BaCO_3$, 4.02 g $SrCO_3$, and 3.57 g $TiO_2$ (x=0.7) and matrix components consisting essentially of 5.66 g of $Na_2O \cdot 2B_2O_3$, 3.51 g $Na_2CO_3$ were combined to produce a mixture having the molar ratio R=0.79:1. The mixture was processed as described in Example 1 to produce BST particles that were well separated, with a BST particle size of about 50 nm within a narrow range of particle sizes.

Example 5

Particle components consisting essentially of 5.13 g $SrCO_3$ and 2.78 g $TiO_2$ (x=1.0) and matrix components consisting essentially of 5.66 g $Na_2O \cdot 2B_2O_3$ and 3.51 g $Na_2CO_3$ were combined, producing a mixture having the molar ratio R=0.62:1. The mixture was melted and quenched as in Example 1, and the flakes produced included a Ti-rich glass phase and a B-rich glass phase. The flakes were further processed as in Example 1 to produce BST panicles. The BST particles were well separated, with a BST particle size of about 50 nm within a narrow range of particle sizes.

Although the particle components used in the examples above included carbonates of Ba and Sr, the BST particle components can include other compounds of Ba and Sr, such as, for example, oxides or hydroxides of Ba and Sr. In addition, in the above examples, the matrix components include two or more compounds, but in some embodiments, the matrix components consist essentially of a single compound.

For purposes of illustration, the above examples describe production of BST particles, but other materials can be similarly produced. For example, particles described by a generic formula $MTiO_3$ can be produced, wherein M is one or more of any of Be, Mg, Ca, Sr, Ba, and Ra. In addition, $TiO_3$ can be produced. Particles of these materials have physical properties such as size, shape, and agglomeration similar to the properties of the BST particles described above. To produce particles of such other materials, corresponding particle components are selected. In addition, for the production of BST or other particles, other matrix components can be selected.

As described above, the particles produced are substantially spherical, i.e. have a mean aspect generally less than about 2:1, desirably less than about 1.5:1, and most desirably less than about 1.25:1. The substantially spherical particles do not tend agglomerate and have dimensions of less than about 50–100 nm.

Figure 4:
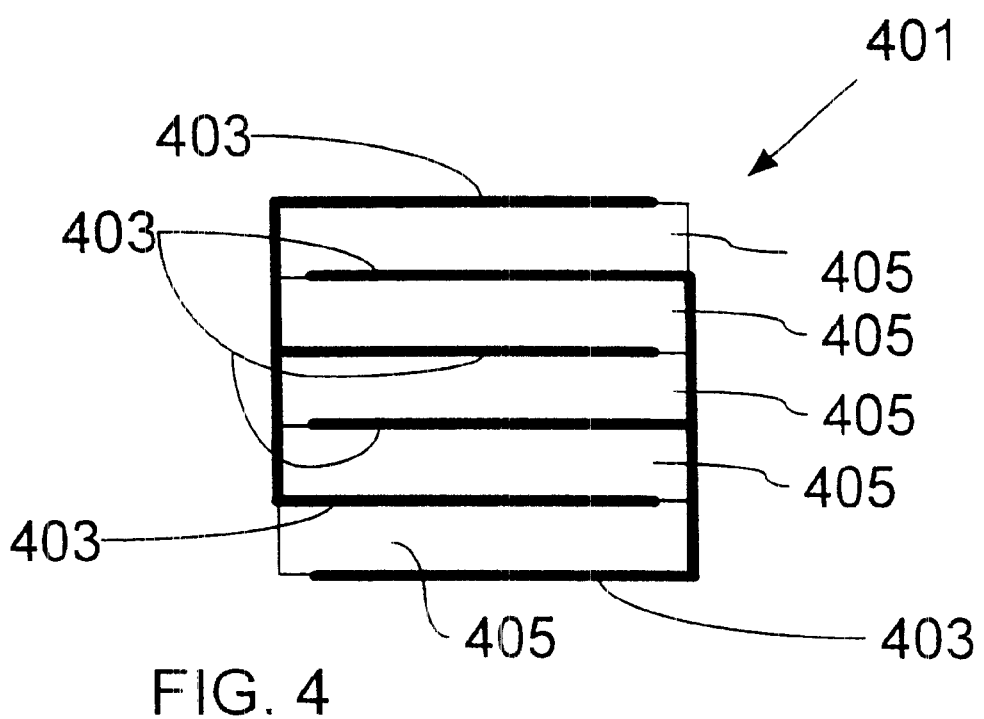
FIG. 4 is a sectional view of a capacitor that includes a BST layer.

The representative BST particles manufactured by the above methods may be used to form a dielectric layer in a capacitor, to form a sputtering target, or other device. FIG. 4 is a sectional view of a capacitor 401 that includes a conductive layers 403 and BST layers 405. The BST layers 405 are typically 500 nm to 1000 nm thick, but can be much thicker or as thin as a single particle layer (in the range of a few tens of nanometers). The BST layers are typically formed by mixing BST particles with a binder to from a slurry that is cast into a sheet using a doctor blade or other method. The slurry is typically is exposed to an elevated temperature to eliminate the binder by vaporization or chemical reaction, or both, leaving a BST particle layer.

Electrodes are formed on the cast sheet by a printing process or other method, and printed sheets are laminated to form a multilayer capacitor structure. Representative printing processes include printing with an ink jet printer, screen printing, or other method. The multilayer capacitor structure is then fired to bind the layers, and external electrodes are applied. Lead wires can be applied to the external electrodes, and a protective layer of an epoxy or other encapsulant applied.

While the invention is illustrated above with several specific examples, particles of various oxides, including iron oxide and tin oxide, as well as particles of semiconductors, insulators, ferroelectrics, and other materials can be similarly fabricated.

It will be appreciated by those skilled in the art, that the embodiments described above can be modified in arrangement and detail without departing from the spirit and scope of the invention. We claim all that is encompassed by the appended claims.

We claim:

1. A method, of manufacturing a powder of a dielectric compound, comprising:
   selecting particle components combinable to form the dielectric compound;
   selecting matrix components that consist essentially of $Na_2O \cdot SiO_2 \cdot 9H_2O$, $Na_2O \cdot 2B_2O_3$, and $Na_2CO_3$;
   mixing the particle and matrix components to form a mixture;
   melting the mixture;
   combining the molten mixture with a quenching liquid to produce a sold material; and
   extracting the powder of the dielectric compound from the solid material.

2. The method of claim 1, further comprising:
   annealing the solid material; and
   extracting the powder from the annealed solid material.

3. The method of claim 2, further comprising selecting a molar ratio of particle components to matrix components so that the solid material is amorphous.

4. The method of claim 3, wherein the particle components are selected to produce $Ba_{1-x}Sr_xTiO_3$ powder, wherein $0 \leq x \leq 1$, and the molar ratio is selected based on a value of x.

5. The method of claim 2, wherein the powder is extracted from the annealed solid material by exposing the solid material to an acidic solution that removes a glassy matrix portion of the solid material.

6. The method of claim 5, further comprising selecting a molar ratio of particle components to matrix components so that the solid material is amorphous.

7. The method of claim 6, further comprising extracting the powder of the dielectric compound from the solution that removes the glassy matrix.

8. The method of claim 7, wherein the powder comprises nanometer-sized particles of the dielectric compound.

9. The method of claim 8, wherein the nanometer-sized particles of the dielectric compound are substantially spherical.

10. The method of claim 2, wherein annealing the solid material includes a first annealing at a first temperature and a second annealing at a second temperature, wherein the second temperature is greater than the first temperature.

11. The method of claim 2, wherein the mixture of the particle components and matrix components is melted by exposing the mixture to a temperature in the range of about 1,100° C. to 1,700° C.

12. The method of claim 1, wherein the dielectric compound is $BaTiO_3$.

13. The method of claim 1, wherein the dielectric compound is $Ba_{1-x}Sr_xTiO_3$, wherein $0 \leq x \leq 1$.

14. The method of claim 1, wherein the particle components are selected from the group consisting of oxides, hydroxides, and carbonates of Da, Sr, and Ti.

15. The method of claim 1, wherein the particle components are selected from the group consisting of barium titanate ($BaTiO_3$), strontium titanate ($SrTiO_3$), barium carbonate ($BaCO_3$), strontium carbonate ($SrCO_3$), and titanium dioxide ($TiO_2$).

16. The method of claim 1, wherein a molar ratio of the particle components to the matrix components is between about 0.40 and 1.60.

17. The method of claim 1, wherein a molar ratio of the particle components to the matrix components is between about 0.40 and 1.60.

18. The method of claim 17, wherein the molar ratio is between about 0.8 and 1.2.

19. A method of manufacturing a powder of a dielectric compound, comprising:
   selecting particle components combinable to form the dielectric compound;
   selecting matrix components that consist essentially of 1.34 parts by mole $Na_2O \cdot 2B_2O_3$, 1.13 parts by mole $Na_2CO_3$, and 1.0 parts by mole $Na_2O \cdot SiO_2 \cdot 9H_2O$;
   mixing the particle and matrix components to form a mixture;
   melting the mixture;
   quenching the molten mixture to produce a solid material; and
   extracting the powder of the dielectric compound from the solid material.

20. A method of manufacturing a powder of a dielectric compound, comprising:
   selecting particle components combinable to form the dielectric compound;
   selecting matrix components from the group consisting of zinc oxide, zinc carbonate, and zinc hydroxide;
   mixing the particle and matrix components to form a mixture;
   melting the mixture;
   quenching the molten mixture to produce a solid material; and
   extracting the powder of the dielectric compound from the solid material.

21. A method of producing a dielectric powder, comprising:
   mixing powder components and matrix components to form a mixture;
   melting the mixture;
   cooling the molten mixture to form a glassy material;
   forming particles of the dielectric powder in the glassy material by annealing the glassy material at a first temperature and then annealing the glassy material at a second temperature, wherein the second temperature is greater than the first temperature; and
   extracting the dielectric powder from the annealed glassy material.

22. A method of producing a dielectric powder, comprising:
   mixing powder components and matrix components to form a mixture, wherein the powder components consist essentially of compounds of Ba, Sr, and Ti and the matrix components consist essentially of $Na_2O \cdot 2B_2O_3$, $Na_2CO_3$, and $Na_2O \cdot SiO_2 \cdot 9H_2O$;

melting the mixture;

cooling the molten mixture to form a glassy material;

forming particles of the dielectric powder in the glassy material by annealing the glassy material at a first temperature and then annealing the glassy material at a second temperature, wherein the second temperature is greater than the first temperature; and extracting the dielectric powder from the annealed glassy material.

23. The method of claim 22, wherein the first temperature is in a range of about 400° C. to 550° C. and the second temperature is in a range of about 550° C. to 700° C.

24. The method of claim 22, wherein a molar ratio of the particle components to the matrix components is selected so that the glassy material includes an amorphous material formed by the matrix components.

25. The method of claim 1, wherein the quenching includes immersing the molten mixture in water.

26. The method of claim 4, wherein the particles components are selected so that $0.3 \leq x \leq 0.7$.

* * * * *

UNITED STATES PATENT AND TRADEMARK OFFICE
CERTIFICATE OF CORRECTION

PATENT NO.   : 6,585,951 B1
DATED        : July 1, 2003
INVENTOR(S)  : Yang-Ki Hong It is certified that error appears in the above-identified patent and that said Letters Patent is hereby corrected as shown below:

Column 4,
Line 32, "adventages" should be -- advantages --.

Column 6,
Line 16, "particle. sizes," should be -- particle sizes --.
Line 43, "SRC$_3$" should be -- SrCO$_3$ --.
Line 59, "separated The" should be -- separated. The --.

Column 9,
Line 21, "A method, of" should be -- A method of --.

Column 10,
Line 7, "Da" should be -- Ba --.

Signed and Sealed this

Tenth Day of May, 2005

JON W. DUDAS
*Director of the United States Patent and Trademark Office*